United States Patent [19]

Colineau et al.

[11] Patent Number: 5,063,467

[45] Date of Patent: Nov. 5, 1991

[54] MAGNETIC HEAD WITH SATURABLE GAP AND MATRIX DEVICE COMPRISING A MULTIPLICITY OF SUCH HEADS

[75] Inventors: Joseph Colineau, Bures sur Yvette, France; Jurgen Machui, Munich, Fed. Rep. of Germany

[73] Assignee: Thomson-CSF, Puteaux, France

[21] Appl. No.: 427,369

[22] Filed: Oct. 27, 1989

[30] Foreign Application Priority Data

Nov. 15, 1988 [FR] France .................. 88 14806

[51] Int. Cl.[5] .................. G11B 5/235; G11B 5/197
[52] U.S. Cl. .................. 360/119; 360/120; 360/126; 360/110; 360/123
[58] Field of Search ............... 360/126, 123, 121, 122, 360/120, 119, 110, 127

[56] References Cited

U.S. PATENT DOCUMENTS

| | | | |
|---|---|---|---|
| 3,485,962 | 12/1969 | Barnes | 360/110 |
| 4,342,039 | 7/1982 | Wang | 346/74.5 |
| 4,380,768 | 4/1973 | Palombo et al. | 346/74.2 |
| 4,646,184 | 2/1987 | Goto et al. | 360/110 |
| 4,775,909 | 10/1988 | Inoue et al. | 360/127 |
| 4,780,779 | 10/1988 | Pisharody et al. | 360/126 |

FOREIGN PATENT DOCUMENTS

| | | | |
|---|---|---|---|
| 0046662 | 3/1982 | European Pat. Off. | 360/123 |
| 0097836 | 1/1984 | European Pat. Off. | |
| 0340085 | 11/1989 | European Pat. Off. | 360/122 |
| 2605783 | 4/1988 | France | |
| 58-32219 | 2/1983 | Japan | 360/123 |

OTHER PUBLICATIONS

Patent Abstracts of Japan, vol. 7, No. 70, (P-185) (1215), Mar. 23, 1983, & JP-A-57 212 614, Y. Ichiyama, "Electromagnetic Head".
Patent Abstracts of Japan, vol. 9, No. 203, (P-381) (1926), Aug. 21, 1985, & JP-A-60 066 310, T. Gotou, "Magnetic Head".

Primary Examiner—A. J. Heinz
Assistant Examiner—Alfonso Garcia
Attorney, Agent, or Firm—Oblon, Spivak, McClelland, Maier & Neustadt

[57] ABSTRACT

A magnetic head employs a gap of magnetic material between two poles. The magnetic material of the gap has a saturation value less than the saturation value of the poles. When the gap material is not saturated, the magnetic field remains contained within this gap.

11 Claims, 4 Drawing Sheets

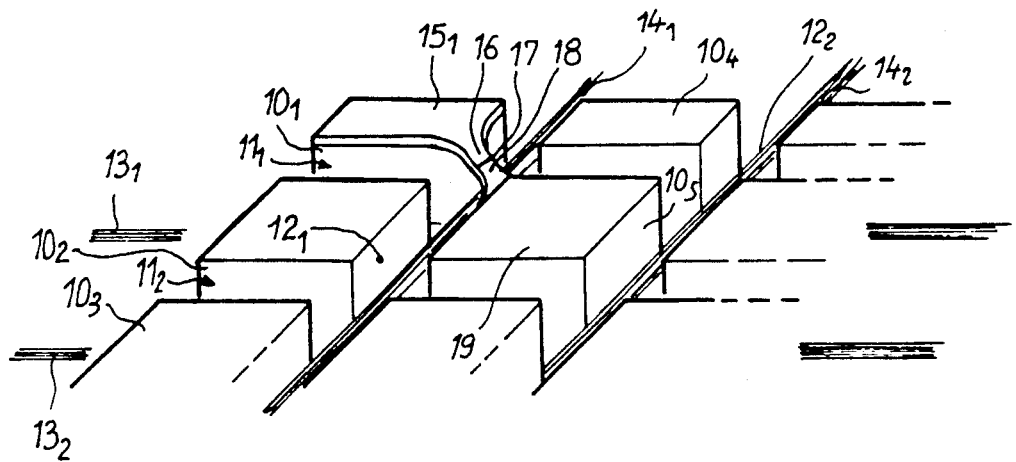
FIG_1
FIG_2

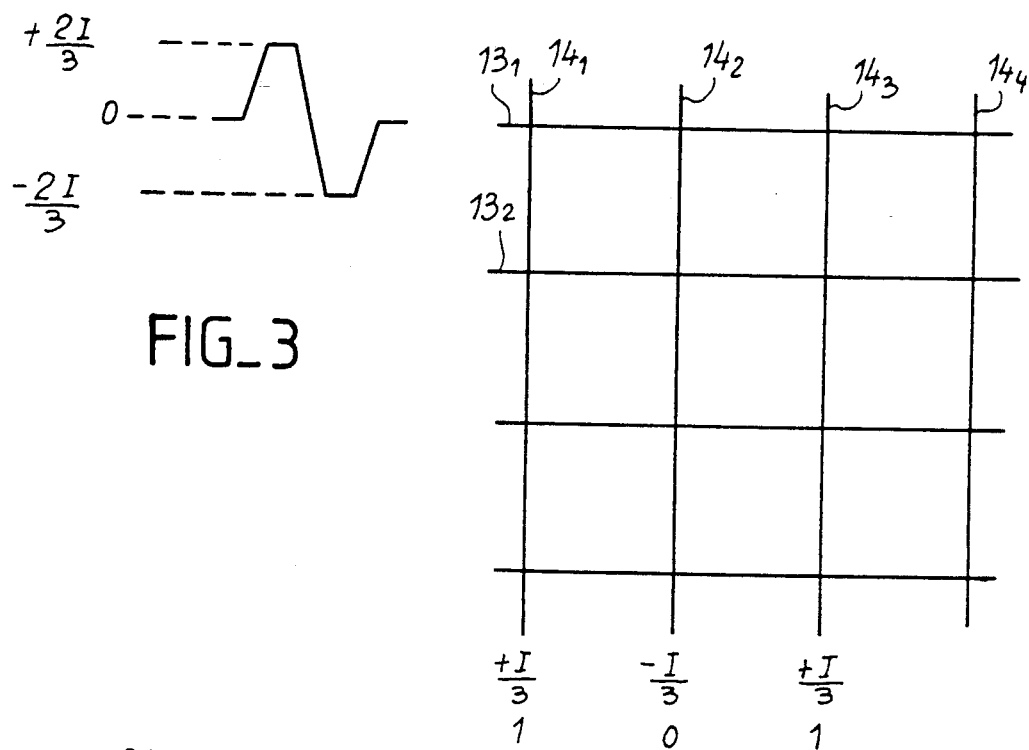
FIG_3
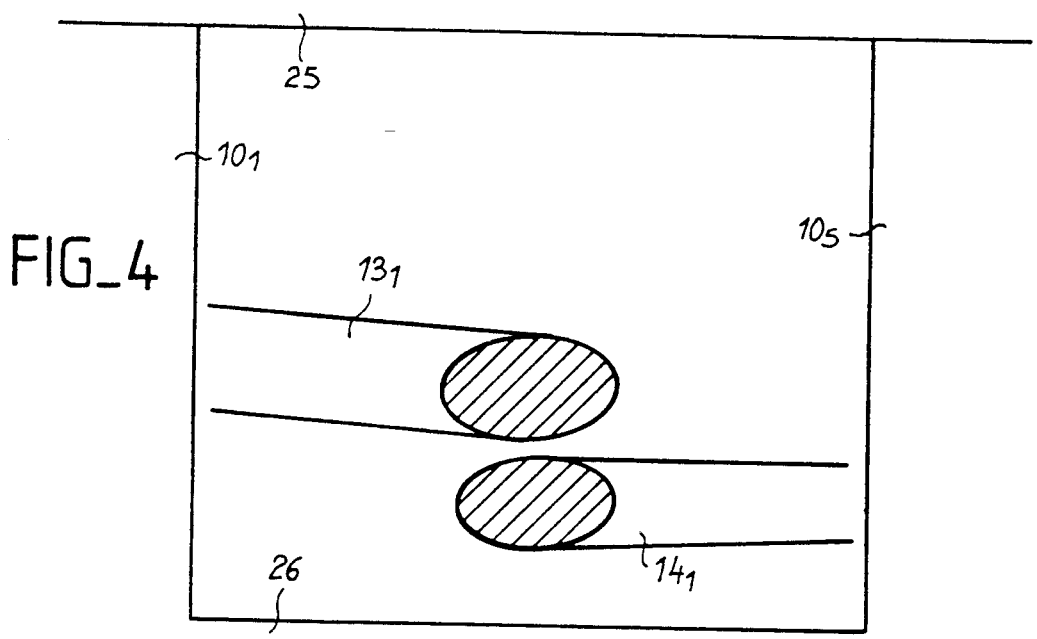
FIG_4

FIG_5
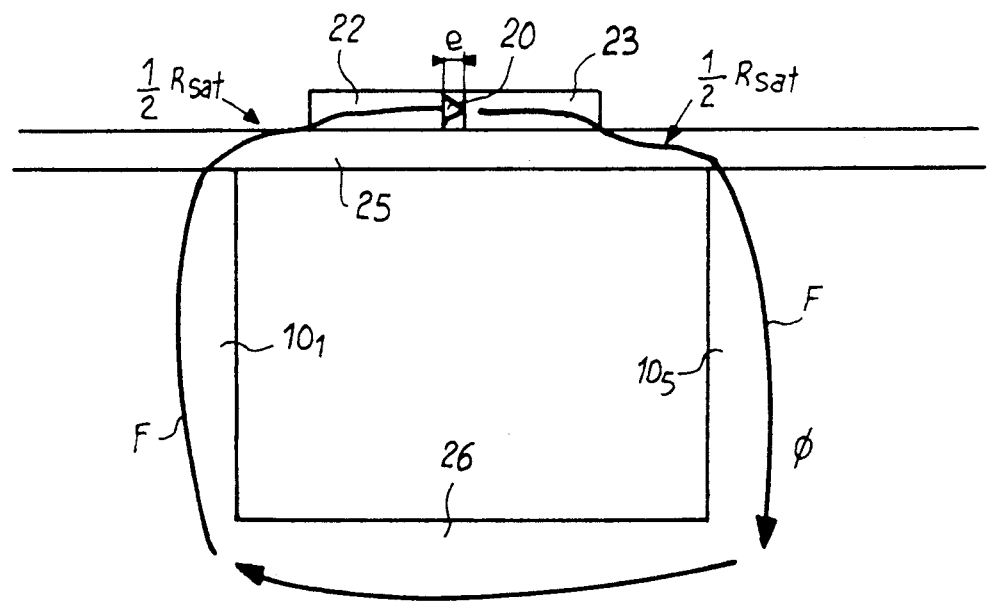
FIG_6
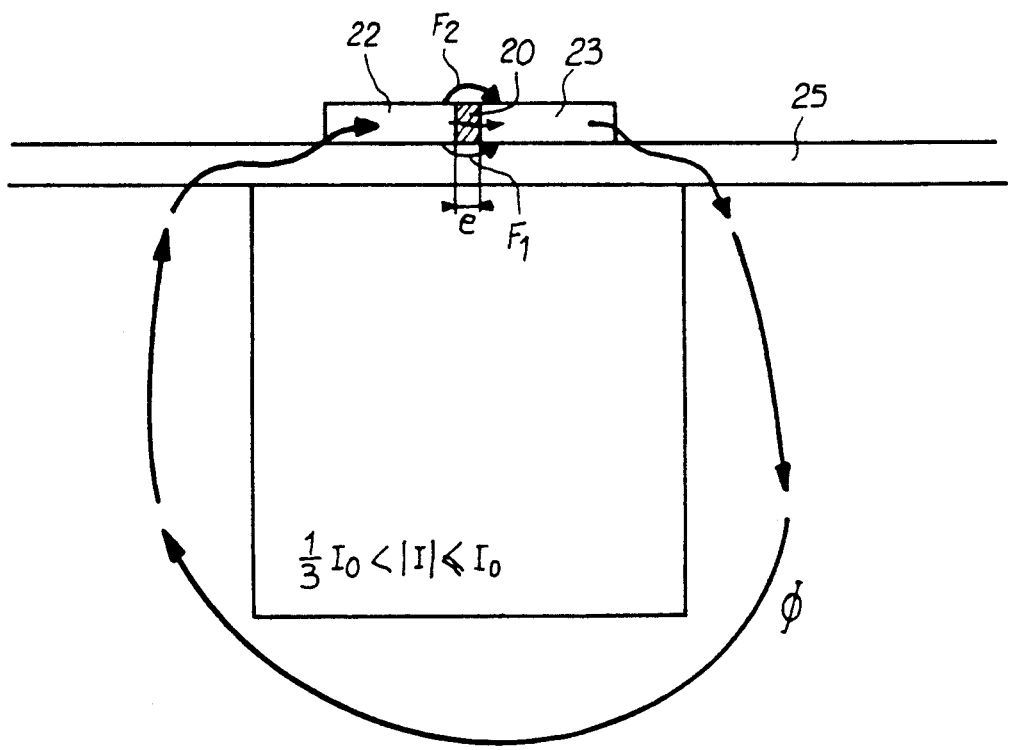

FIG_7
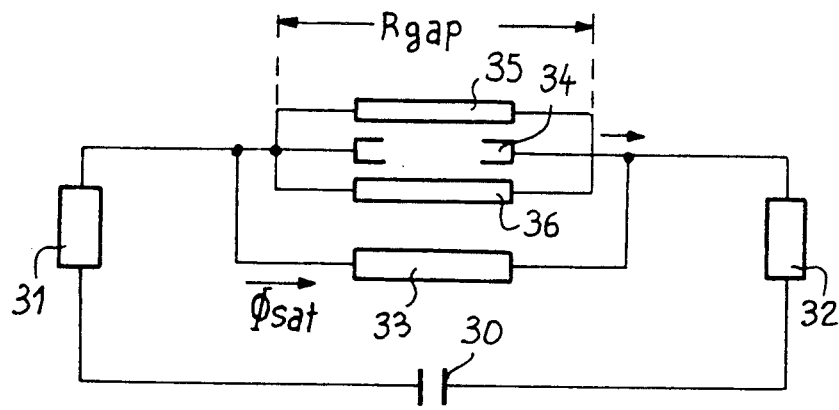
FIG_8
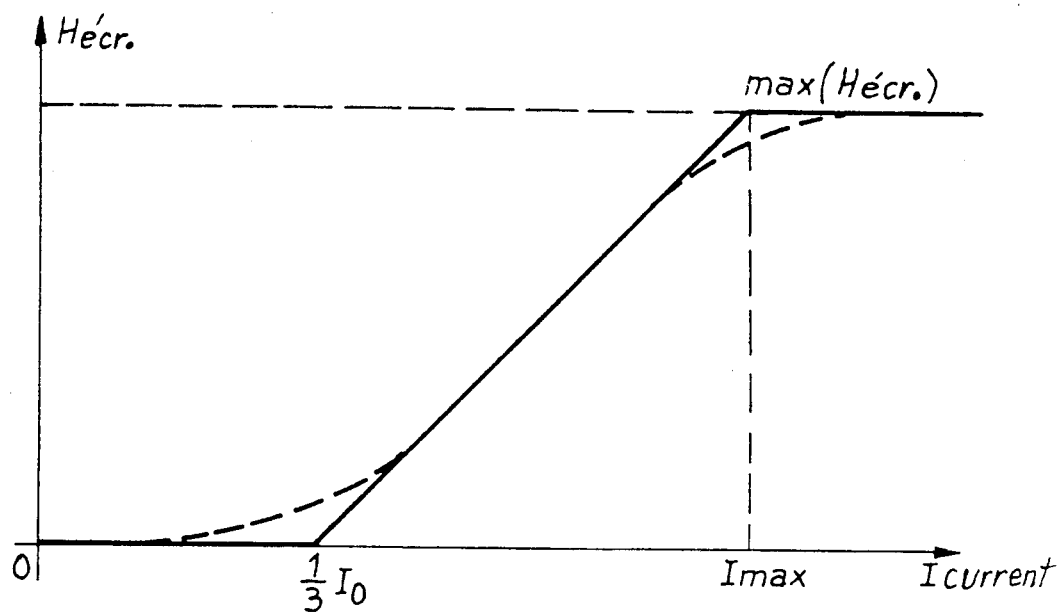

MAGNETIC HEAD WITH SATURABLE GAP AND MATRIX DEVICE COMPRISING A MULTIPLICITY OF SUCH HEADS

BACKGROUND OF THE INVENTION

1. Field of the Invention

The invention relates to a magnetic head intended particularly to be part of a recording device with a multiplicity of heads.

2. Description of the Prior Art

A magnetic head is a device for recording and/or reading data on a magnetic support. Recording is achieved by causing the magnetization of the support to vary locally.

Such a head comprises two magnetic poles separated by a nonmagnetic gap. To record data, a magnetic field is induced in a magnetic circuit comprising the two poles and the magnetic support is applied against the ends of the poles and against the gap. Thus, the magnetic circuit is closed by the support at right angles to the gap, which makes possible magnetization (or demagnetization) of the support at this spot.

Reading of data recorded on the support is obtained by an electrical signal which results from an electromotive force induced by varying the magnetic flux in the magnetic circuit closed by the support. This variation of flux comes from the variation of the magnetization on the support when the latter is moved relative to the head or vice versa, when the head is moved relative to the support.

For some applications it is considered that a signal is recorded on the magnetic support only when the magnetization of this support exceeds a determined threshold. The magnetizations of the support below the threshold, during reading, cause parasitic signals which it is preferable to eliminate by special arrangements of the reading circuit.

The magnetic head according to the invention makes it possible to magnetize the support only when the magnetic flux exceeds a determined threshold, which eliminates the parasites during reading.

SUMMARY OF THE INVENTION

For this purpose, this head is characterized in that the gap comprises a magnetic material with saturation less than that of the material constituting the poles and such that, when this material is not saturated, the magnetic field remains in the gap and therefore does not go through the support. Only when the gap is saturated can the support be magnetized because then the magnetic flux can escape from the gap material.

When the excitation of the magnetic circuit is slight, the gap is not saturated and the reluctance of the magnetic circuit is slight; as a result the material of the gap can be easily saturated. In some cases, this property is the opposite of the object desired here, namely to avoid recording data on the magnetic support for slight excitations. To reduce the effect of the variation of reluctance introduced by the saturable gap, there is provided, in an embodiment of the invention, in the magnetic circuit of the head, outside the gap, a nonmagnetic element that increases the total reluctance of the circuit by a considerable value.

In an embodiment, this reluctance is obtained by placing a layer of nonmagnetic material between the magnetic circuit, with which the excitation wires are associated, and the unit formed by the two poles and the gap.

Regardless of its embodiment, a magnetic head according to the invention is particularly useful for making a device with a multiplicity of magnetic heads in which the heads are placed in the form of a matrix network and, to excite the heads, a network of conductive wires associated with this matrix network is provided so that each head is coupled to a line wire and a column wire. The intensity of the electric current in each of the two conductors of a head recording data on the support exhibits a first value; the heads that do not have to record data are associated with at least one conductor through which there passes a current of an intensity having a determined second value less in absolute value than the first value. For example, the first value is a current with intensity I and the second value is a current of intensity $-I/3$. In this case, the characteristics of each magnetic head are selected so that the support is magnetized only when the sum of the intensities in the two wires of one head is greater than the value $2I/3$.

For addressing, as a variant, two successive pulses of opposite polarity go through a conductor associated with a head recording data on the support and a current of constant intensity goes through the other conductor associated with the head, the sum of this constant intensity and of the intensity of the pulse of the same sign as this constant current being sufficient to record a piece of information while the sum of the constant intensity and the pulse of opposite polarity is insufficient to record a piece of information, i.e., to magnetize the support.

In this variant, the intensity of the constant current is, for example, about half the intensity of a pulse in one direction.

BRIEF DESCRIPTION OF THE DRAWINGS

Other characteristics and advantages of the invention will come out from the description of some of its embodiments, the latter being made with reference to the accompanying drawings in which:

FIG. 1 is a perspective diagrammatic view of a matrix device with a multiplicity of magnetic heads to which the invention is applied, FIG. 2 is a diagram showing an addressing of a matrix device, FIG. 3 corresponds to a variant of FIG. 2, FIG. 4 is a diagram of a magnetic head according to the invention, and FIGS. 5 to 8 are diagrams and graphs illustrating the functioning of the magnetic head of FIG. 4.

DESCRIPTION OF THE PREFERRED EMBODIMENTS

FIG. 1 represents a matrix device with magnetic heads for recording data on a magnetic support such as a tape (not shown) with a multiplicity of tracks.

This matrix device comprises a plate of magnetic material, for example of ferrite, from which blocks $10_1$, $10_2$, $10_3$, $10_4$, $10_5$, etc... project, blocks of rectangular section and separated by grooves $11_1$, $11_2$... $12_1$, $12_2$...

Grooves $12_1$, $12_2$, etc., are parallel to one another and perpendicular to grooves $11_1$, $11_2$...

Straight conductive wires $13_1$, $13_2$... are placed in line grooves 11. Straight conductive wires $14_1$, $14_2$... are placed in column grooves 12.

The end exposed surface of each rectangular magnetic block 10₁ is covered by a layer 15 of a magnetic material which is extended at one corner, in the direction of a diagonal of the rectangle along a strip 16 separated by a gap 17 of a corresponding strip 18 extending another magnetic layer 19 over a neighboring block 10₅ whose diagonal of the rectangular surface extends the corresponding diagonal of block 10₁.

Conductors 13₁, 14₁ which are at right angles to gap 17 produce a magnetic field for recording a piece of data on the magnetic support which, of course, is placed in the vicinity of gap 17.

In a first example (FIG. 2) a current of intensity I goes through some of the conductors and a current of intensity $-I/3$ goes through other conductors. A magnetic head records a piece of information on the magnetic support when a current of intensity I goes through the two conductors associated with this head. On the other hand, if a current of intensity $-I/3$ goes through one of the two conductors or both conductors, no data are recorded on the magnetic support by the corresponding magnetic head.

Thus it is seen that when the excitation current has the value 2I, a piece of information is recorded; on the other hand, when this excitation current has the value $2I/3$ or $-2I/3$ no information is recorded on the support.

Therefore, it is understood that for an excitation current of intensity $\pm 2I/3$, it is preferable that the magnetic head not cause any magnetization of the support, while for an excitation current of intensity 2I, it is preferable that the magnetization of the support be maximum. This end is achieved, according to the invention, thanks to the head that will be described below with reference to FIG. 4.

In another example (FIG. 3) for recording binary data (1 or 0), two successive pulses go through each line: a positive pulse, i.e., a current of intensity $+2I/3$, followed by a negative pulse, i.e., a current of intensity $-2I/3$. If it is desired to record a digit "1", a current $+I/3$ goes through the corresponding column, while if it is desired to record the digit "0" a current of intensity $-I/3$ is made to go into the corresponding column. Thus, when a current of intensity $+I/3$ goes through the column during the positive pulse $2I/3$ from the line, the excitation current has intensity I sufficient to record a piece of information, while during negative pulse $-2I/3$ on the line, the excitation current is $-I/3$, insufficient to record a piece of information.

Also, when a current of intensity $-I/3$ goes through a column during a positive pulse $2I/3$ on the line, the excitation current of the corresponding head is $I/3$, insufficient to record a piece of information, while during the negative pulse the excitation current is $-I$, which makes possible the recording of a "0".

Of course, in the embodiment of FIG. 3, the lines are addressed one by one for recording the data.

In this embodiment, as in the preceding one, it is preferable that an excitation corresponding to a current intensity of $+I/3$ or $-I/3$ not cause any magnetization of the support while an excitation corresponding to a current of intensity I should cause a maximum magnetization of the magnetic support.

To obtain this result, material 20 of the gap of magnetic head 21 according to the invention (FIG. 4) is a magnetic material saturable to a saturation value less than that of the material, or materials, constituting magnetic poles 22 and 23.

To improve still more the effect of gap 20 of saturable material, the unit formed by poles 22 and 23 and gap 20 is separated from ferrite blocks 10₁ and 10₅ by a layer 25 of nonmagnetic material.

The functioning is the following:

When the absolute value of the sum of the excitation currents in conductors 13₁ and 14₁ is less than a third of a predetermined value I₀, the flux of the magnetic field flows as represented by arrows F in FIG. 5 in the magnetic circuit comprising: ferrite substrate 26 with its projecting blocks 10₁ and 10₅, nonmagnetic layer 25, poles 22 and 23 and gap 20. In this case (intensity less than I₀/3) the magnetic material of gap 20 is not saturated and thus the magnetic field remains confined in this gap.

On the other hand, when the absolute value of the sum of the intensities of the currents flowing in conductors 13₁ and 14₁ exceeds the value I₀/3, the material consituting gap 20 is saturated and thus, as represented in FIG. 6, the magnetic field is not confined in the gap. A part F₁ goes into nonmagnetic layer 25 and another part F₂ moves away from this gap opposite layer 25. This part F₂ of the magnetic field is used to record on a magnetic support (not represented).

The desired result is indeed obtained: the magnetic support is not magnetized when the absolute value of the sum of the currents in conductors 13₁ and 14₁ does not exceed I₀/3. On the other hand, magnetization of the magnetic support occurs as soon as said absolute value of the sum of the intensities exceeds I₀/3, a value starting from which the material of gap 20 is saturated.

In the example, poles 22 and 23 are of Sendust, i.e., an alloy of iron, aluminum and silicon comprising, for example, in atomic percentage, 74% of iron, 9% of aluminum and 17% of silicon.

On the other hand, the material of gap 20 is of a degraded Sendust, i.e., a material with magnetization at lower saturation, for example, whose proportion of aluminum is greater than that of said Sendust. This degraded Sendust contains, in atomic percentage, for example, 64% or iron, 15% of aluminum and 21% of silicon.

As a variant, the material of gap 20 is a ferrite or other magnetic material.

It is also possible to make the gap from the same material as poles 22 and 23 provided that it is given a smaller section than that of the poles. In this case, the depth (dimension perpendicular to the support) of the gap, for example, is smaller than the depth of the poles.

Nonmagnetic layer 25 introduces in the magnetic circuit a reluctance of great value which contributes to obtaining the desired result, namely, the nonsaturation for current intensities which, in absolute value, are less than I₀/3 and the saturation of material 20 for excitations of current corresponding to absolute values greater than I₀/3.

Of course, the value of this reluctance depends on the dimensions and geometry of the magnetic circuit as well as the nature of the material of the gap.

The fact that the saturation of material 20 occurs for a current I₀/3 is expressed by the following relation:

$$R_{sat} = \frac{1}{3} \frac{I_0}{\phi_{sat}} \tag{1}$$

In this formula, $R_{sat}$ represents the reluctance that nonmagnetic layer 25 introduces. This reluctance exhibits, in the example, two parts of equal value ½ $R_{sat}$, one between block $10_1$ and pole 22 and the other between block $10_5$ and pole 23. Up to the saturation of material 20, the reluctance introduced by the other elements of the magnetic circuit can be ignored.

$\phi_{sat}$ represents the flux flowing in the magnetic circuit. This flux is proportional to thickness e of gap 20 and to the magnetization of the magnetic material in this gap.

To obtain a maximum value of recording flux $F_2$ for $I = I_0$, the following considerations are used as a basis:

The electrical equivalent of the magnetic circuit of FIG. 6 is represented in FIG. 7: generator 30 is a magnetomotive force generator corresponding to an excitation current 1 between $I_0/3$ and $I_0$. Elements 31 and 32 are two elements corresponding to reluctances ½ $R_{sat}$. Element 33 in series between elements 31 and 32 corresponds to the reluctance of the unsaturated gap material. Three other reluctances 34, 35 and 36 are in parallel on this reluctance 33. Reluctance 34 corresponds to the part of the flux exceeding the saturation value which goes into gap 20. Reluctance 35 corresponds to flux $F_2$ while reluctance 36 is the reluctance opposing the passage of flux $F_1$.

The circuit represented in FIG. 7 reflects the fact that, for an intensity I between $I_0/3$ and $I_0$, in absolute value, part $\phi_{sat}$ of the flux which causes the saturation sees that the magnetic material is saturated, therefore with slight permeability, while the rest of flux $\phi - \phi_{sat}$ (generated by current $I - I_0/3$) flows in the circuit as with a standard gap filled with a nonmagnetic material. In this case, the reluctance equivalent to reluctances 33, 34, 35 and 36 in parallel is not small in comparison with the value of reluctances 31 and 32.

Recording flux $F_2$ is maximum for $I = I_0$ if, for this current, poles 22 and 23 are saturated. Beyond saturation, the recording magnetic field no longer increases. This property is represented in the graph of FIG. 8 where there have been plotted, on the X-axis, intensity I of the excitation current which represents the sum of the intensities in conductors $13_1$ and $14_1$ and, on the Y-axis, recording magnetic field $H_{ecr}$. It is seen on this FIG. 8 that if $|I| < I_0/3$, the recording magnetic field is zero while for $|I| > I_{max}$ ($I_{max} = I_0$) the recording magnetic field remains practically constant.

It will be possible to understand more precisely the behavior of the magnetic circuit from an example for which:

$$R_{sat} = R_{gap} \quad (2)$$

In this formula, $R_{gap}$ represents the reluctance equivalent to reluctances 34, 35 and 36 in parallel. It is assumed that value $R_{sat}$ (and therefore $R_{gap}$) is known; it should be further noted that the value $R_{gap}$ is imposed by the width of the track to be recorded, width e of the gap and the thickness of the layer of magnetic material forming poles 22 and 23.

Then an effort is made to calculate $\phi_{sat}$ and $I_0 = I_{max}$ (FIG. 8).

The total flux corresponds to the maximal flux permitted for an excitation of intensity $I_0$.

Consideration of the circuit of FIG. 7 makes it possible to write the following formula:

$$\phi - \phi_{sat} = \frac{I - 1/3\, I_0}{R_{sat} + R_{gap}} \quad (3)$$

-continued for $I = I_0$, $\phi = \phi_{max}$, thus $$\phi_{max} - \phi_{sat} = \frac{2/3 I_0}{R_{sat} + R_{gap}} = \frac{2/3\, I_0}{2\, R_{gap}} = \frac{I_0}{3\, R_{gap}} \quad (4)$$

or $$I_0 = 3 R_{gap}(\phi_{max} - \phi_{sat}) \quad (5)$$

It is seen that the maximal recording field, which corresponds to $\phi_{max} - \phi_{sat}$, requires three times more current than the minimum value of the field that makes a recording possible.

From formulas (1) and (5) above there is deduced:

$$\phi_{sat} = \tfrac{1}{2}\phi_{max} \quad (6)$$

Thus, half the saturation value of the material of poles 22 and 23 is available for creation of the recording magnetic field if materials and configurations that satisfy relation (2) above are used for gap 20 and for poles 22 and 23.

In the example where poles 22 and 23 are of Sendust, the maximal density of the flux corresponding to $\phi_{max}$ is about 10,000 G. If $R_{sat} = R_{gap}$, it is possible to use 5,000 G for recording. The intensity of current $I_0$ is then on the order of 5A.

In the general case, if reluctance $R_{sat}$ introduced by nonmagnetic layer 25 is increased, the proportion of the magnetic flux which can be used for recording a piece of information is increased relative to flux $\phi_{sat}$ used to saturate the gap. Actually, the maximum useful flux for recording is $\phi_{max} - \phi_{sat}$ and said proportion therefore is:

$$\frac{\phi_{max} - \phi_{sat}}{\phi_{sat}} = \frac{1}{\phi_{sat}} \cdot \frac{2/3 I_0}{R_{sat} + R_{gap}} =$$

$$\frac{1}{\phi_{sat}} \cdot \frac{2\phi_{sat} R_{sat}}{R_{sat} + R_{gap}} = \frac{2 R_{sat}}{R_{sat} + R_{gap}}$$

The ratio is greater the greater $R_{sat}$ is relative to $R_{gap}$. However, if $R_{sat}$ increases it is necessary to increase $I_0$.

Although the example described relates to a device with a multiplicity of magnetic heads, the invention also applies to a device with a single magnetic head making it possible to magnetize a magnetic support starting from a determined value of the excitation current.

We claim:

1. A matrix magnetic head device comprising:
   a plurality of magnetic heads;
   conductors associated with each of said plurality of magnetic heads and extending in rows and columns for producing a magnetic field within the magnetic heads when an excitation current flows through the conductors;
   wherein each of the magnetic heads comprises two magnetic poles separated by a gap comprising a magnetic material having a saturation value less than a saturation value of the poles, the gap being saturated only at a predetermined threshold first intensity of excitation current and the poles being saturated at a predetermined threshold second intensity of excitation current which is substantially equal to three times that of the first intensity, such that when the gap is not saturated, the magnetic field remains confined within the gap.

2. A device according to claim 1, wherein the material of the gap is a ferrite.

3. A device according to claim 1, wherein the material of the gap is an alloy of iron, aluminum and silicon.

4. A device according to claim 3, wherein the material constituting the poles is an alloy of iron, aluminum and silicon with an aluminum content less than that of the gap material.

5. A device according to any of claims 1, 2 or 3, wherein the poles consist of the same material as the gap material and wherein a depth of the gap is smaller than a depth of the poles.

6. A device according to claim 1, further comprising a layer of material having a reluctance far greater than that of the poles and the gap when the gap material is not saturated.

7. A device according to claim 6, wherein the layer of material comprises a nonmagnetic material.

8. A device according to claim 7, wherein the layer of nonmagnetic material is situated adjacent the poles.

9. A matrix magnetic head device comprising:
a plurality of magnetic heads;
conductors extending in rows and columns for carrying an excitation current which produces a magnetic field within said plurality magnetic heads, wherein each intersection of a row conductor and a column conductor is associated with each magnetic head;
wherein each of the magnetic heads comprises a pair of poles separated by a gap comprising a magnetic material having a saturation value less than a saturation value of the poles, a saturation of the gap of each head occurring when a sum of intensities of the excitation currents in the row and column conductors associated with each head attains a first intensity value, and the saturation of the poles of each head occurring when of the sum of intensities attains a second intensity value, the second value being about three times the first value, such that when the gap is not saturated the magnetic field remains confined within the gap.

10. A matrix device according to claim 9, further comprising a substrate of magnetic material from which blocks project, wherein the poles and the gap are situated on the ends of the blocks.

11. A matrix device according to claim 9, wherein, when recording data, the row conductors are addressed by successive current pulses of opposite polarities, an absolute value of each current pulse being about double the first intensity value, and currents of intensity equal to the first intensity value flow through the column conductors, whereby the polarity of the current in the column conductors determines the type of data to be recorded.

* * * * *